United States Patent
Benson et al.

(10) Patent No.: US 8,078,484 B2
(45) Date of Patent: Dec. 13, 2011

(54) LOSS PREPORTING SYSTEM AND METHOD WITH VIEWABLE PERFORMANCE BASED REPORTS

(75) Inventors: Wayne Mark Benson, Waynesville, OH (US); Joshua Alan Marsh, Lebanon, OH (US)

(73) Assignee: The Kroger Co., Cincinnati, OH (US)

( * ) Notice: Subject to any disclaimer, the term of this patent is extended or adjusted under 35 U.S.C. 154(b) by 1275 days.

(21) Appl. No.: 11/261,218

(22) Filed: Oct. 28, 2005

(65) Prior Publication Data
US 2007/0100681 A1   May 3, 2007

(51) Int. Cl.
G06F 17/00   (2006.01)
(52) U.S. Cl. ...................................... 705/7.11
(58) Field of Classification Search ............. 705/10, 705/7.11
See application file for complete search history.

(56) References Cited

U.S. PATENT DOCUMENTS

| | | |
|---|---|---|
| 6,366,890 B1 | 4/2002 | Usrey |
| 6,609,101 B1 | 8/2003 | Landvater |
| 2001/0049690 A1 | 12/2001 | McConnell et al. |
| 2002/0091593 A1 | 7/2002 | Fowler |
| 2002/0099678 A1 | 7/2002 | Albright et al. |
| 2003/0004925 A1 | 1/2003 | Knoblock et al. |
| 2003/0040925 A1 | 2/2003 | Gutta et al. |
| 2004/0049427 A1* | 3/2004 | Tami et al. ................... 705/24 |
| 2004/0215662 A1 | 10/2004 | Rangadass |
| 2005/0096963 A1 | 5/2005 | Myr et al. |
| 2005/0261954 A1* | 11/2005 | Aoyama et al. ............. 705/10 |
| 2006/0015532 A1* | 1/2006 | Mizell ........................ 707/104.1 |

OTHER PUBLICATIONS

Hiiggins, Kelly Jackson; Dare to Webify your back office; Sep. 1, 1997; InternetWeek, n679, p. 83(6), dialog copy.*
Wilson, Tim; A way to Webify legacy data; Sep. 15, 1997; InternetWeek, n681, p. 1(2), dialog copy.*

* cited by examiner

Primary Examiner — Thomas Dixon
(74) Attorney, Agent, or Firm — Pillsbury Winthrop Shaw Pittman LLP (57) ABSTRACT

A loss reporting system and method for tracking, monitoring and evaluating loss in an enterprise is provided. The system receives product data from enterprise facilities, stores the product data, calculates performance information from the product data, and compares the performance information to a predetermined performance standard. The system can generate a viewable report using the comparison between the performance information and the predetermined performance standard.

18 Claims, 8 Drawing Sheets

Store Exception-Based Report Results

Week Ending Date 06/18/2005

| | Sunday | Monday | Tuesday | Wednesday | Thursday | Friday | Saturday | Total | Flag |
|---|---|---|---|---|---|---|---|---|---|
| Sold Units Base | 570 | 468 | 440 | 369 | 383 | 484 | 527 | 3,241 | N/A |
| Markdown Units Sold | 5 | 9 | 33 | 16 | 15 | 9 | 2 | 89 | Green |
| Loss Units | 19 | 37 | 56 | 96 | 24 | 16 | 11 | 259 | Green |
| Loss Dollars (Retail) | $123.78 | $387.26 | $380.41 | $366.86 | $177.38 | $115.07 | $88.53 | $1,639.28 | N/A |

Fig. 6

Zone Exception-Based Report Results

Week Ending Date 06/18/2005

Sales, Loss Markdown Exceptions:

| | Sunday | Monday | Tuesday | Wednesday | Thursday | Friday | Saturday | Total |
|---|---|---|---|---|---|---|---|---|
| Sold Units Base | 22,010 | 18,875 | 16,212 | 15,719 | 16,127 | 17,245 | 20,504 | 126,692 |
| Markdown Units Sold | 1,344 | 1,138 | 1,244 | 1,251 | 1,315 | 1,347 | 1,141 | 8,780 |
| –Markdown Units Sold Red Flag Stores: 558 | 328 | | | | | | | |
| Loss Units | 587 | 643 | 513 | 617 | 679 | 810 | 752 | 4,601 |
| –Loss Units Red Flag Stores: | 330 ⌐215, 371, 558, 562, 803, 923, 926, 977 | | | | | | | |
| Loss Dollars (Retail) | $4,046.70 | $4,474.52 | $3,260.98 | $4,327.98 | $4,959.68 | $5,190.06 | $4,675.42 | $30,935.33 |

Fig. 7

LOSS PREPORTING SYSTEM AND METHOD WITH VIEWABLE PERFORMANCE BASED REPORTS

TECHNICAL FIELD

The present application relates generally to loss reporting, and more particularly to a computer-based reporting system and method for evaluating loss in an enterprise.

BACKGROUND

Enterprises manage financial and inventory data for products and services. For example, it has been proposed to monitor item sales velocity in a consumer retail store by determining when sales occur too swiftly or too slowly. A software system is first "trained" in a learning mode that evaluates an item's sales velocity probability and when the actual sales deviate too far from this probability, the system informs the user. If an item moves too swiftly, it may become out-of-stock earlier than expected. If an item moves too slowly, it may indicate a lack of consumer access to the item, such as when the item is out-of-stock or not present on a shelf.

It has also been proposed to construct a conceptual hierarchical framework representing a virtual or physical retail store environment and populate the environment with a collection of items. For example, the environment is represented as an environmental hierarchy comprising elements such as a floor, zones within a floor, planning units within zones and row segments within each planning unit that can represent a virtual or physical embodiment. This framework can represent a physical retail environment where items are read into the system using a handheld scanner.

It has further been proposed to use a category definition and variety optimization system to provide retail stores with reports displaying sales data for a single store or a chain of stores or to show how the store or chain is performing relative to the market. Items are placed into "velocity classes" based upon their average throughput over a certain period of time. Additionally, it has been proposed to use a time-phased planning system in a retail store supply chain to generate replenishment plans for goods in one or more retail stores.

However, while managing financial and inventory data is important to an enterprise, most enterprises lack the ability to compare loss performance to predetermined standards. Enterprises also lack the ability to compare loss performance among the various organizational entities of the enterprise or groups thereof. What is needed therefore is a computer-based reporting system to evaluate loss in an enterprise.

SUMMARY

In an aspect, a computer-based method for evaluating loss includes receiving product data from facilities of an enterprise. The product data is stored and performance information is calculated from the product data. The performance information is compared to a predetermined performance standard, and one or more viewable reports are generated using the comparison between the performance information and the predetermined performance standard.

In another aspect, a computer-based method for evaluating loss includes collecting product data from one or more items at facilities of an enterprise with a scanning device. The scanned product data is sent to a database remote from the scanning device and the product data is stored in the database. Performance information is calculated using the product data and the performance information is compared to a predetermined enterprise performance standard for loss. One or more viewable exception-based reports is generated using the comparison between the performance information and the predetermined performance standard.

In yet another aspect, a computer-based system for evaluating loss includes an enterprise database having product data received from multiple enterprise facilities stored in memory. One or more scanning devices are included for use in transmitting the product data from the enterprise facilities to the enterprise database and one or more computer terminals are located remote from the enterprise database. A performance calculation application compares the product data with a predetermined performance loss standard and creates viewable reports using the comparison, whereby employees can request and view reports on the computer terminals.

BRIEF DESCRIPTION OF THE DRAWINGS

While the specification concludes with claims particularly pointing out and distinctly claiming the loss reporting system, it is believed that the loss reporting system will be better understood from the following description in conjunction with the accompanying figures, in which like reference numerals identify like elements, and wherein:

DETAILED DESCRIPTION

For the purpose of describing an embodiment of the loss reporting system, this description will often discuss a large retail grocery enterprise. This embodiment is merely exemplary in nature and is in no way intended to limit the loss reporting system or the uses thereof. Alternatively, this loss reporting system can be used in other retail, wholesale or service enterprises. As used herein, the term "application" refers to a software application or process that carries out a specified action, procedure or data operation on a computer.

I. System and Method Overview

The loss reporting system and method developed herein enables management to track, monitor and evaluate loss across an enterprise. As used herein, the term "loss" refers to a reduction in value. In some instances, the reduction may be a percent of the original value, such as with a markdown in price of an item. In other instances, the reduction may be total such as, in some instances, where an item is discarded, e.g., due to spoilage or damage. An enterprise may comprise a number of enterprise facilities, such as stores, that may be grouped by geographical or corporate characteristics, such as divisions. As used herein, a "facility" is something that is built, installed, or established to serve a particular purpose. Divisions may be defined by geographical location, type of store (e.g., convenience store or superstore) or demographics (e.g., rural, urban or suburban). In addition, the demographic profiles of store customers may be used to group stores (e.g., suburban middle class neighborhood or suburban upper income neighborhood). As used herein, a store may be a retail outlet, wholesale outlet, restaurant, branch office, Internet presence or any other physical or virtual location where transactions involving products or services occur between customers and the enterprise. The store may be accountable for meeting budgetary commitments on a regular basis and may have profit and loss accountability to the entire enterprise.

Stores may be subdivided into smaller sections or departments to more effectively control and track their revenue and expenses. Examples of departments for a typical large retail store (a superstore) may include a men's clothing department, women's clothing department, toy department, consumer electronics department, grocery department, sporting goods department, automotive department, pharmacy department, furniture department, shoe department, alcoholic beverages department, house wares department, baby department and the like. In a typical grocery store, examples of departments may include a meat department, pharmacy department, grocery department, produce department, frozen foods department and the like. Departments may be subdivided into commodities to facilitate better control over the activities in the department. For example, the meat department may be subdivided into commodities such as hot dogs, bacon and the like. Commodities may be further divided into products. For example, a brand of hot dogs, such as Ballpark Franks®, of a particular style and size may be a product within the hot dog commodity. As used herein, an "item" is a unit of sale of a product.

The loss reporting system and method described herein can enable employees to track, monitor and evaluate loss both horizontally and vertically across an enterprise. Loss can be evaluated by comparing loss performance between organizational entities or groups thereof. An organizational entity can be a store, division, zone or other organizational unit. Loss occurs where a store fails to sell an item for its base price, such as when an item is lost (e.g., due to damage, mishandling, stolen, etc.), is out-dated and/or is sold at a markdown, clearance or salvage price. The system may be used, for instance, to track loss resulting from items that passed their out-date or were sold at one or more markdown levels. Loss information can either be presented alone or contrasted against sales information. This loss information can be used, for example, to identify areas of opportunity to increase sales and to reduce shrink.

Figure 1:
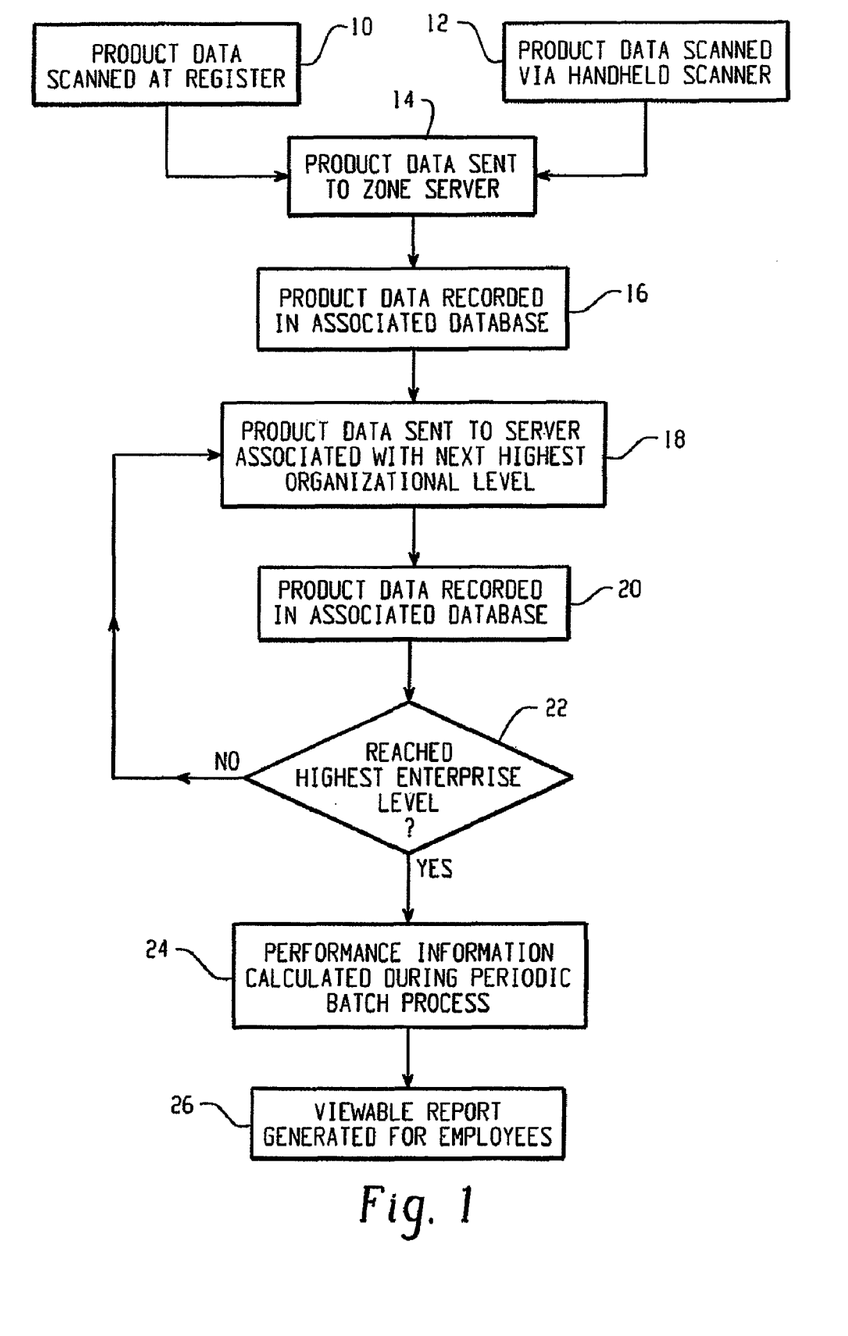
FIG. 1 is a diagrammatic view illustrating a process for reporting loss in an enterprise.

The flowchart of FIG. 1 illustrates a process for a system that evaluates loss in an enterprise. In individual physical stores, sales and loss data are collected via steps 10 and 12. At step 10, when a user purchases an item, product data related to the sale of the item is scanned into the point-of-sale (POS) system at a register scanner. For instance, the scanned product data may indicate whether the item was sold at base price or at a markdown level. In an Internet-type store, the register scanner may be replaced by virtual checkout functionality enabling a customer to purchase the item. At step 12, when an item is past its expiration date (out-dated), marked for salvage, damaged or otherwise requires action by a store employee, the employee scans the item using a handheld scanner with the appropriate code (e.g. "OD" for out-dated).

In an enterprise providing perishable goods, such as fresh fruits and vegetables in a large retail grocery enterprise, tracking of out-dated items is especially important since the out-dated items may be thrown away without recovering any portion of the wholesale cost. This is unlike, for instance, a consumer electronics store, where items can be sold at a clearance or salvage price after they fail to sell for a certain period of time. In such enterprises providing non-perishable items, tracking whether items were sold at a markdown level, clearance price or salvage price is important. The register scanner may record markdown or clearance sales and a handheld scanner may indicate, e.g., through use of barcode technology that items are being disposed of or have been sold at a salvage price to a wholesaler, retailer or other purchasing entity.

At step 14, the scanned product data is then sent to a zone server associated with a group of stores and recorded in a database associated with the zone server at step 16. In other embodiments, the product data may be sent directly to the enterprise server and stored in an associated database. This may be desirable, for instance, in enterprises that have a relatively flat organizational hierarchy and may also be desirable in enterprises having a relatively vertical organizational hierarchy.

At step 18, the product data is then sent to a higher level organizational entity associated with the store and recorded in a database associated with said server at step 20. Product data may be sent to servers associated with higher level organizational entities as soon as it is received or via a periodic update process. For instance, every afternoon at 3:00 p.m., the store servers in a particular zone may send daily product data to the zone server. Alternatively, each store or group thereof in the zone may send updates to the zone server at a predetermined time. The product data could also be broadcast to multiple servers associated with higher level organizational entities that receive it through a data retrieval application that looks for the broadcast on one or more ports or a range thereof. As indicated by step 22, in this embodiment the process of passing product data along to the next highest organizational entity is repeated until the product data eventually reaches the enterprise server. In other embodiments, the enterprise server may not contain all product data for the enterprise, instead relying on a distributed network of databases associated with lower organizational levels of the enterprise or groups thereof to maintain a record of product data.

At step 24, a performance calculating application generates performance information by comparing sets of product data with predetermined performance standards for loss. The performance calculating application may reside on any server in the enterprise or be distributed across multiple servers, performing a piece of the calculation load at each distributed server. While in this embodiment the performance calculating application calculates performance information during a periodic batch process at step 24, calculation of performance information may occur when the data first arrives at the enterprise server, upon user request (see FIG. 2) or by any other reasonable means. In enterprises where large volumes of performance data are processed, a batch process running during low server load times may be the most efficient and effective way to calculate enterprise-wide performance data.

At step 26, employees at a store, division or other organizational entity are able to view reports from a report-generating application. The report-generating application may reside on a local computer terminal or may be web-based, the latter configuration enabling the application to reside on a server remote from the employee's terminal. In a web-based system, the report-generating application and the performance calculating application may exist in the same program. Reports generated by the report-generating application may be printed so employees can review a hard copy. The reports may also compare performance of an organizational entity or group thereof to another organizational entity or group thereof and display data pertaining to factors including, but not limited to, dollar loss, unit loss, units sold, markdown dollar loss, markdown unit loss and percent loss.

The reports may be exception-based, comparing performance information to predetermined performance standards and using visual indicators and/or text to "flag" loss performance. A range of performance standards may also be used to establish multiple performance categories, with performance information being flagged to indicate the category in which the data belongs. Where performance information for an enterprise entity or a group thereof falls outside a tolerance set at the enterprise level or another level of the organizational hierarchy, the report-generating application may challenge managers to improve performance or offer suggestions of how to do so. Such suggestions or messages could, for instance, appear on the user interface screen for the report or be a link therefrom. This functionality assists the enterprise in promoting entity compliance with enterprise initiatives.

Figure 2:
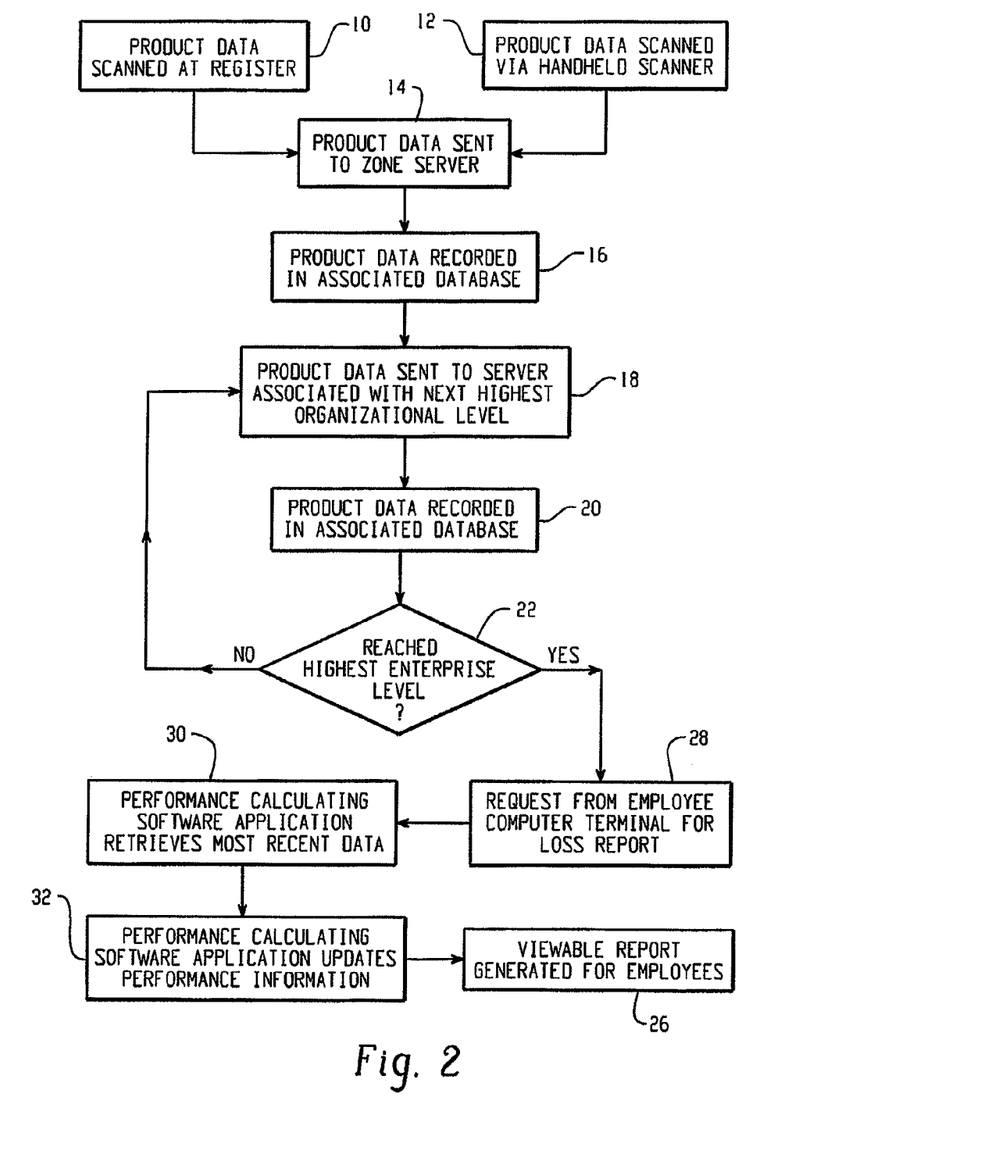
FIG. 2 is a diagrammatic view illustrating another process for reporting loss in an enterprise.

The flowchart of FIG. 2 illustrates a process for evaluating loss in an enterprise where calculation of performance information occurs upon user request. This embodiment may be desirable where an enterprise does not desire to allocate computing resources for a large batch process, runs relatively small reports or has relatively small sales volumes. The system follows a similar process to that described in FIG. 1 until reaching step 28, where an employee for an organizational entity requests a certain type of loss report using a report-generating application, which may either reside on a local computer terminal or be web-based and located on a remote server. The request for the report is then sent to a performance calculating application.

Rather than calculating all performance information during a periodic batch process, in this embodiment, the performance calculating application retrieves the most current product data required for the loss calculations of the requested report at step 30. At step 32, the performance calculating application updates the required performance information in one or more databases associated with enterprise organizational entities. At step 26, similar to FIG. 1, the report-generating application then uses the updated performance information to generate the desired loss report, which is displayed on a local computer terminal for the requesting employee to view.

II. Exemplary Embodiment of Loss Reporting System

Figure 3:
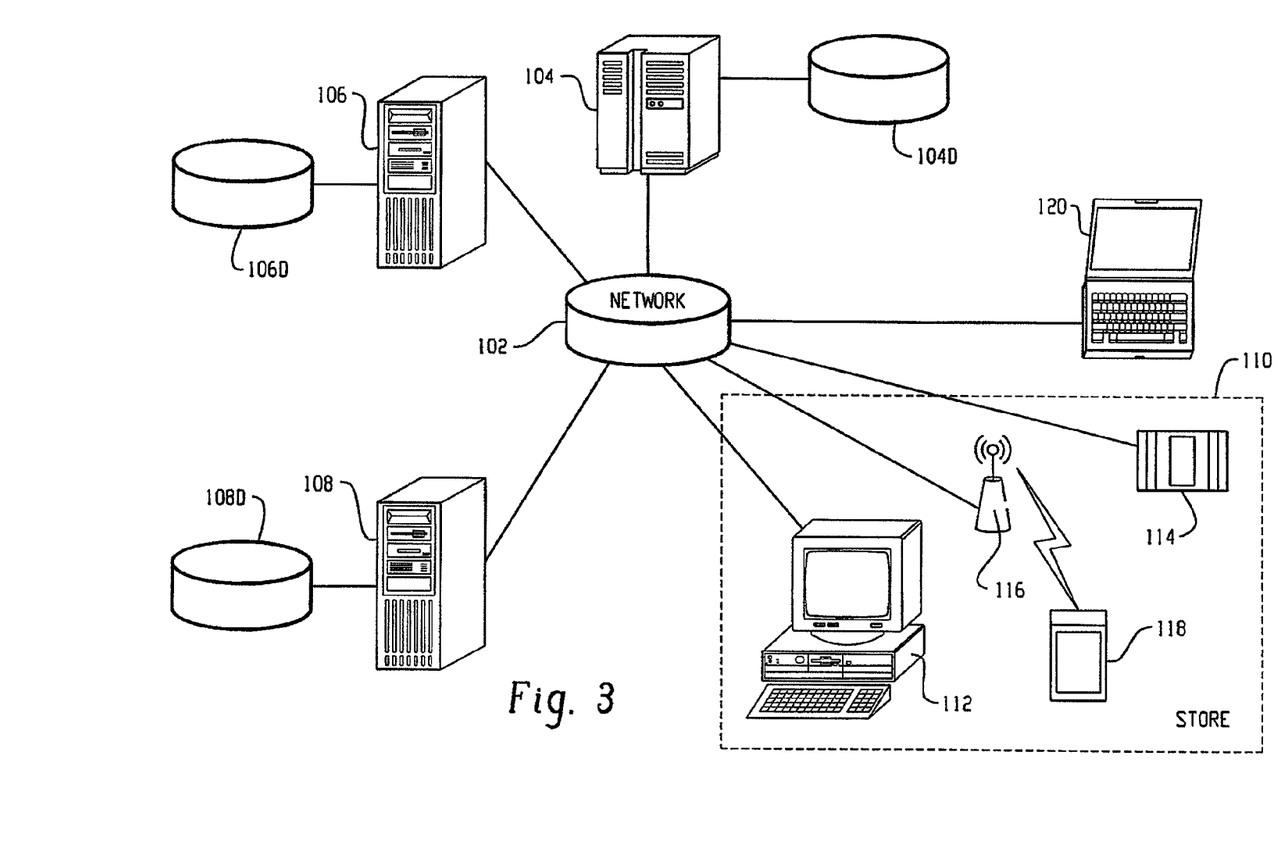
FIG. 3 is a diagrammatic view illustrating an embodiment of a loss reporting system architecture.

FIG. 3 is an architectural diagram illustrating an operational environment for an embodiment of the loss reporting system. In this example, the enterprise is organized by divisions, zones and stores. A network 102 is depicted in the center and represents any type of computer network, telecommunications network, or a combination thereof. In some embodiments of the loss reporting system, the network 102 can be a company-wide intranet. In other embodiments, local area networks (LANs), or wide area networks (WANs), such as multiple LANs linked together by bridges, routers or similar devices, can serve as the network 102. In addition, the network 102 can include common carrier transmission lines and equipment, such as those provided by an Internet service provider (ISP), to link remote computers.

Also depicted in FIG. 3 are an enterprise server 104, a division server 106 and a zone server 108, which are connected to the network 102. Each of the servers 104, 106 and 108 has an associated database 104D, 106D and 108D, respectively, for storing product or service data pertinent to each organizational level of the enterprise. While not shown here, it is understood that the databases 104D, 106D and 108D could also be connected to the network and reside in separate locations from the servers 104, 106 and 108. In some embodiments, multiple servers for different organizational levels may share a database. In other embodiments, multiple databases for different organizational levels may be connected to a single server.

In a store 110, there is a computer terminal 112, a register scanner 114 and a wireless router 116, which are also connected to the network 102. A handheld scanner 118 communicates with the wireless router 116 via Bluetooth®, 802.11 (g) or another wireless communication protocol. A personal computer 120 is also connected to the network 102 so employees who are traveling, at home or otherwise away from an enterprise facility can access the system. While one of each server, database, computer, router, scanner and the like is illustrated here, this is by way of example only and other embodiments of the loss reporting system may contain more or fewer of any component depicted herein.

III. Exemplary Database Schema

Figure 4A:
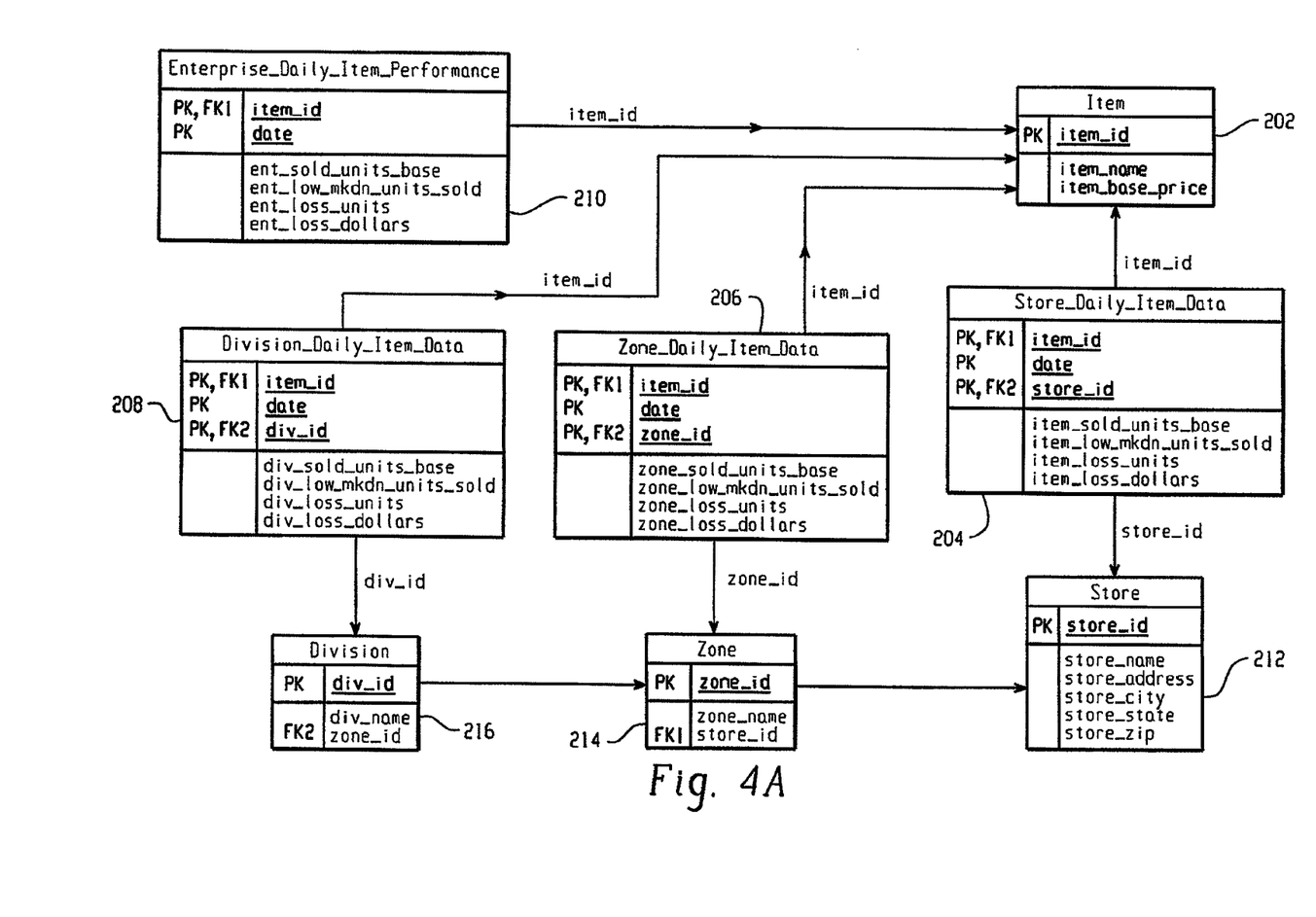
FIG. 4A is a diagrammatic view illustrating an embodiment of a relational database for loss reporting.
Figure 4B:
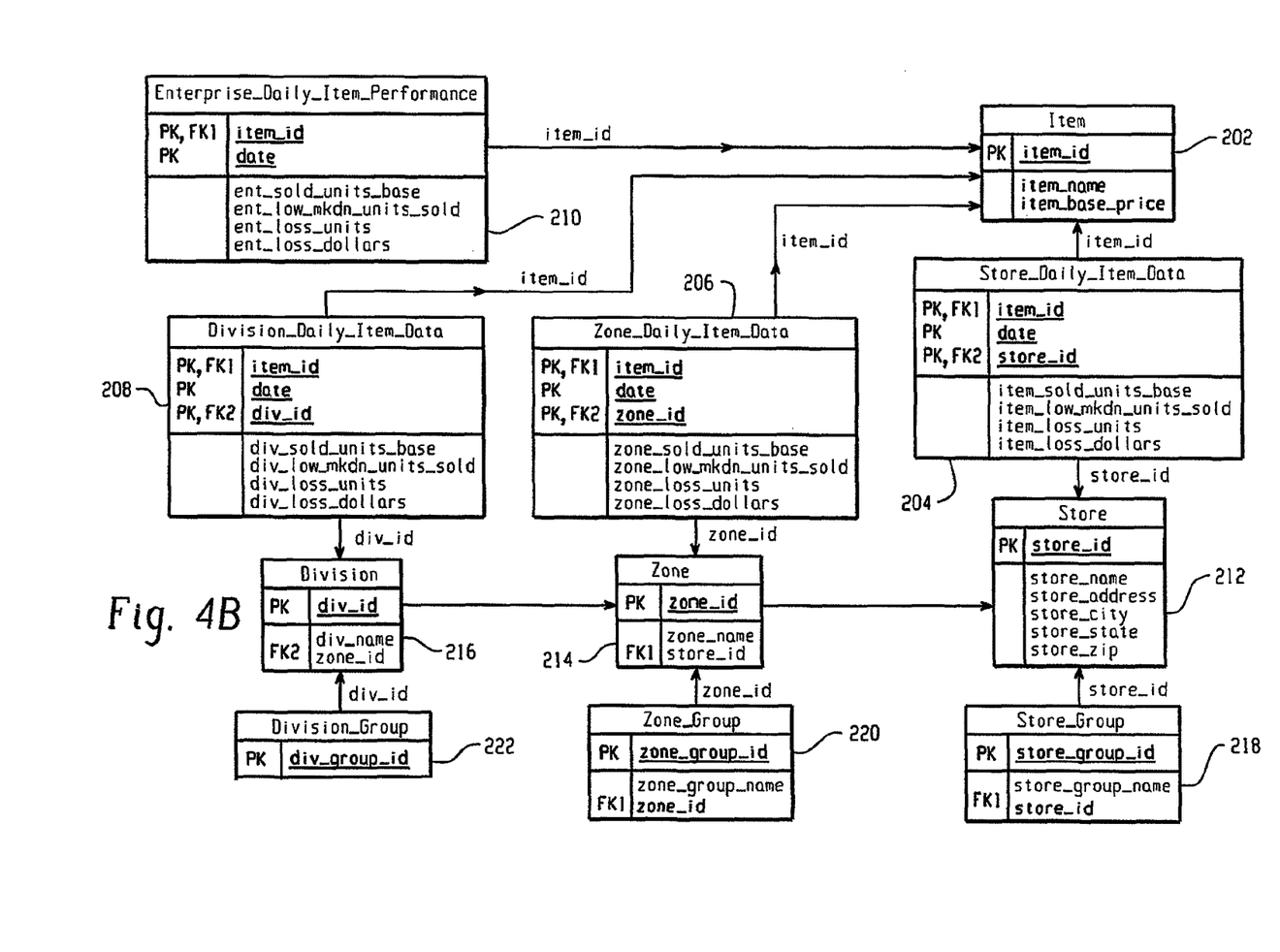
FIG. 4B is a diagrammatic view illustrating another embodiment of a relational database for loss reporting.

FIGS. 4A and 4B illustrate embodiments of relational database schemas for a computer-based system for evaluating loss in an enterprise. A plurality of database tables record daily product information for a preferred embodiment of the loss reporting system where the enterprise has stores, zones and divisions. Loss and markdown information is recorded on a daily basis here, but in other embodiments, data for other time periods (e.g., hourly, weekly or monthly) could also be stored. While not shown here, markdown information could be stored and updated for multiple markdown levels. Additionally, loss and markdown information need not necessarily be updated on a periodic basis. For instance, the tables may be updated upon user request.

In this example, the name of each data field is descriptive of the type of data which it represents. For instance, the data fields of the Item table 202 are named item_id, item_name and item_base_price, respectively. These fields contain basic product information for the items an enterprise sells, including a unique item identifier (which could be a UPC code or other internal identifier), item name and base price. The fields in this example can be of any applicable data type. For instance, in a SQL database, item_id may be of type INTEGER, item_name may be of type VARCHAR(10) and item_base_price may be of type CURRENCY. The arrows connecting the database tables shown in FIGS. 4A and 4B represent foreign key relationships among the tables. For instance, the Store_Daily_Item_Data table contains item_id, which is both a primary key for the Store_Daily_Item_Data table and a foreign key to the Item table.

When a daily update process runs, daily loss and markdown numbers for each item are calculated and stored in tables at the store 204, zone 206, division 208 and enterprise 210 levels, which are keyed based upon an internal item ID number, an ID associated with the organizational entity (such as store_id from the Store_Daily_Item_Data table) and a date. Basic tables containing the store 212, zone 214 and division 216 names are also shown for reference as a single entry lookup for the names of organizational entities, rather than redundantly copying entity names in each daily item data table. The division table 216 contains the zone_ids of its zones and the zone table 214 contains the store_ids of its stores. In other embodiments, tables may store periodic data at a commodity, department or other organizational level.

In FIG. 4B, basic tables are shown that allow stores 218, zones 220 and divisions 222 to be organized into various groups. This may be desirable for developing custom loss comparisons that are not available from any individual organizational entity. These tables 218, 220 and 222 have a one-to-many relationship with stores 212, zones 214 and divisions 216, respectively. Each of the group tables 218, 220 and 222 illustrated here define groups of entities at the same hierarchical level of the enterprise, enabling horizontal comparisons across the enterprise organizational structure. However, in other embodiments, group tables may allow entities at different hierarchical levels to belong to a single group (e.g., a table that contains fields for member store_ids, zone_ids and group_ids).

IV. User Interface

Figure 5:
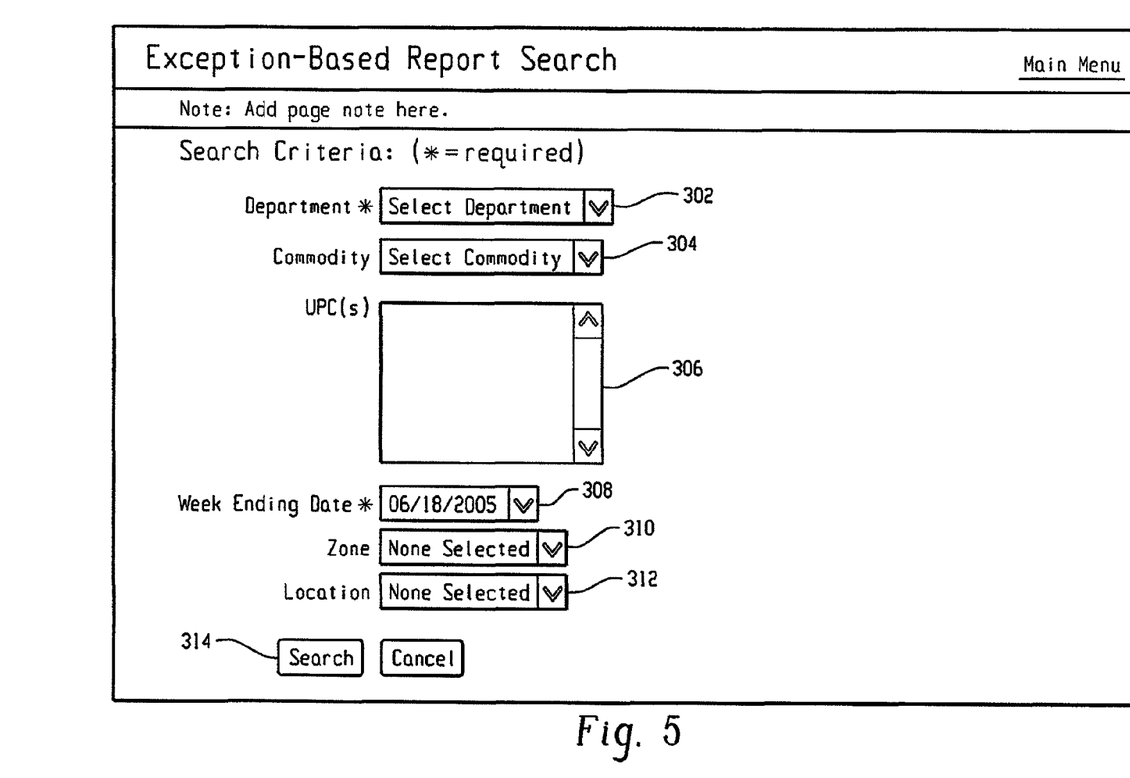
FIG. 5 is a prospective view illustrating a user interface for a search screen for exception-based loss reports.
Figure 6:
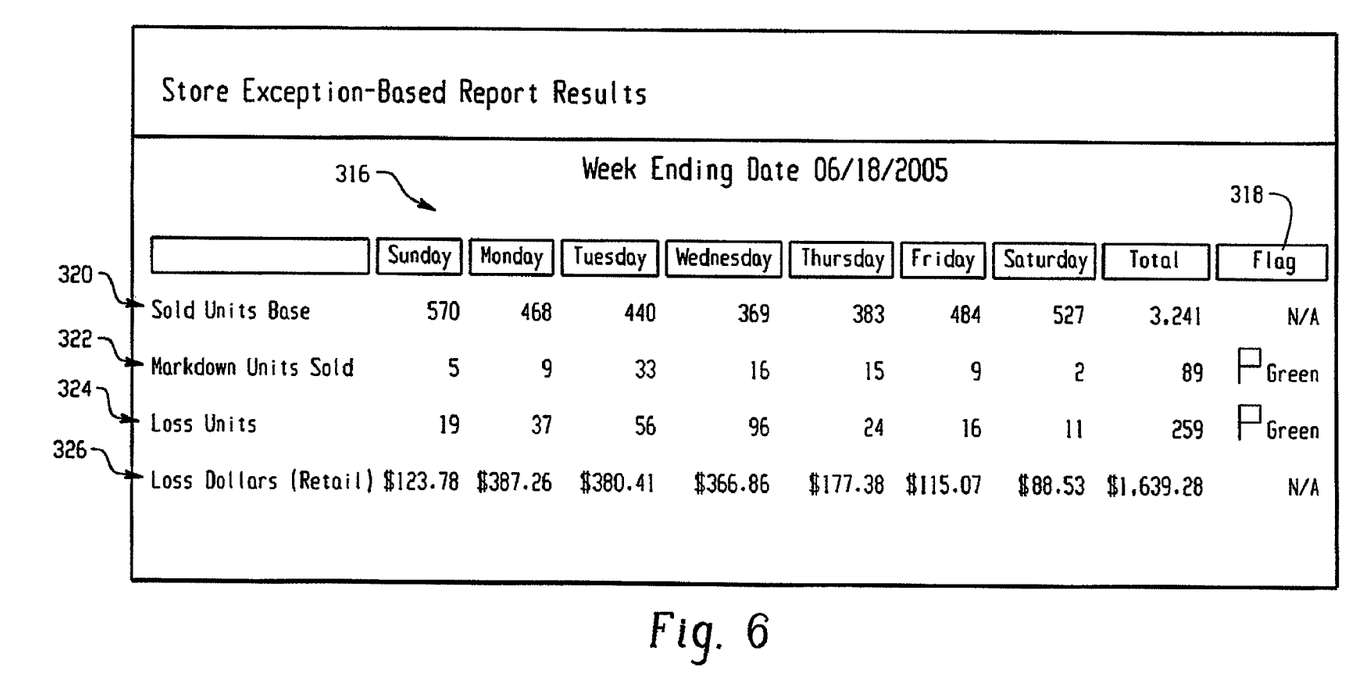
FIG. 6 is a prospective view illustrating a user interface for a store level view of an exception-based loss report.
Figure 7:
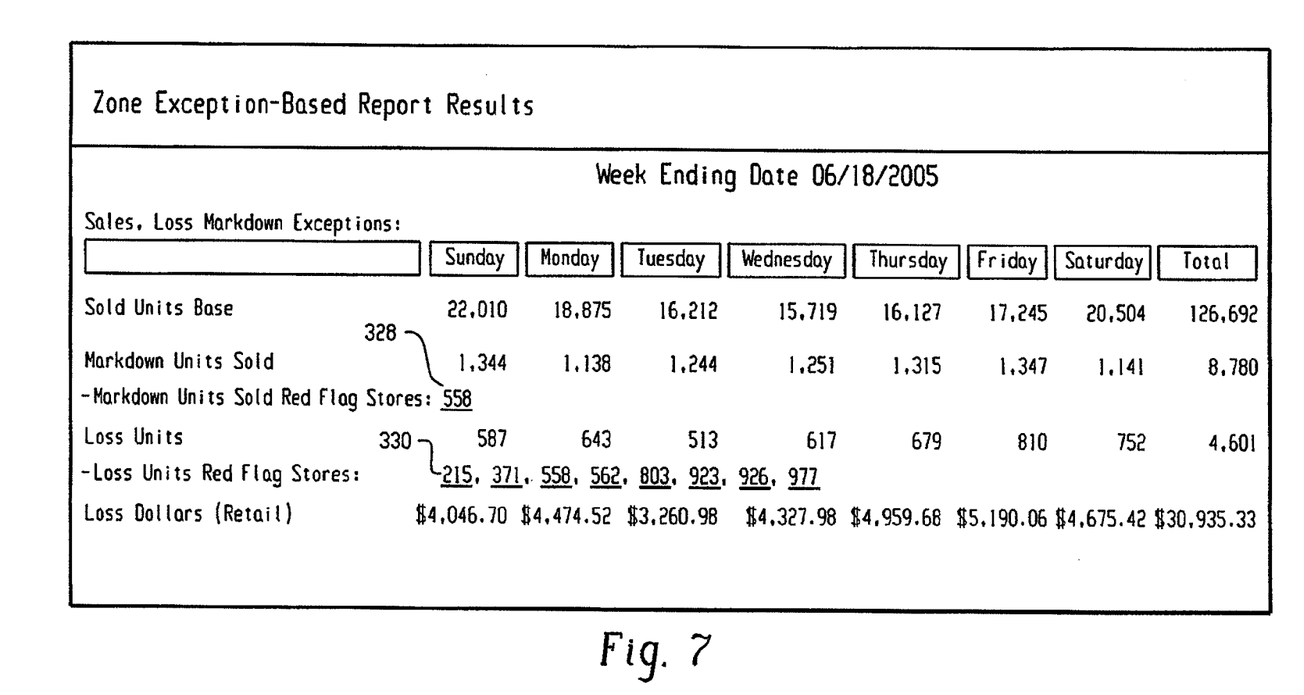
FIG. 7 is a prospective view illustrating a user interface for a zone level view of an exception-based loss report.

FIGS. 5-7 illustrate exemplary user interfaces for the report-generating application, which is able to retrieve data from database tables associated with the system. Referring to FIG. 5, a search screen of a report-generating application for sales and loss information. In this example, a manager wishes to view performance information from a particular store (for instance, Cincinnati, Ohio.) for a product (for instance, Ballpark Franks®) for the week ending Jun. 18, 2005. The manager selects MEAT under the department drop-down menu 302, HOT DOGS under the commodity drop-down menu 304, and the UPC referencing Ballpark Franks® (for instance, 61414121022), which appears in the UPC box 306 after the department and commodity is selected, along with the UPCs of other products in the category. He then selects the week ending Jun. 18, 2005 from the week ending date drop-down menu 308. Next, he selects the desired zone, SOUTHEAST OHIO, from the zone drop-down menu 310, selects CINCINNATI from the location drop-down menu 312, and hits the search button 314.

The report-generating application then retrieves the performance information for the Cincinnati store. Assuming that the report-generating application uses the database configuration from FIG. 4A and looked up the store_id for Cincinnati, Ohio when populating the drop-down menus from FIG. 5, the report-generating application would then seek to retrieve the desired performance information. In this example, the system has been implemented using a relational SQL database. The report-generating application could retrieve data using a relational database connectivity protocol such as ODBC or JDBC. The report-generating application may use the following SQL query:

SELECT s.item_sold_units_base, s.item_low_mkdn_units_sold, s.item_loss_units, s.item_loss_dollars FROM Store_Daily_Item_Data s, Item i WHERE i.item_UPC_code=61414121022 and i.item_id=s.item_id and s.date BETWEEN '2005-06-12' AND '2005-06-18'

The report-generating application would run the query through its JDBC or ODBC driver functions to communicate with the database and retrieve the desired results.

Referring to FIG. 6, an illustration of an embodiment of the user interface for a store level exception-based report. The column headings 316 show product information for each day of the week, the weekly total and whether any of the performance information has been flagged 318 based upon a predetermined performance standard. Product information is displayed for units sold at the base price 320, units sold at the lowest markdown level 322, loss units 324 and loss dollars 326. In this example, the flags 318 are only applicable to units sold at the lowest markdown level 322 and loss units 324. Here, the store has complied with the applicable performance standards, displaying a green flag and the text "green" for lowest markdown level 322 and loss units 324.

Referring to FIG. 7, an illustration of an embodiment of the user interface for a zone level exception-based report for a product. The zone level exception-based report shows units sold at base price, units sold at lowest markdown level, loss units and loss dollars similar to FIG. 6. However, at the zone level, links to stores that failed to meet predetermined performance standards are available. In this example, a number of stores failed to meet markdown units 328 or loss units 330. When a user clicks these links, they bring up a store level report, as illustrated in FIG. 6. The flags and text would be different than those shown in FIG. 6 to indicate noncompliance with performance standards, such as a red flag accompanied by the text "red". It should be noted that a "green" flag may not necessarily indicate good performance. It may merely indicate a minimum acceptable performance. Likewise, a "red" flag may not necessarily indicate bad performance. For example, a red flag may result from a facility not carrying a particular item and thus that facility cannot meet the minimum standard for that item.

While no flags are shown for performance at the zone level in this embodiment, other embodiments flag zone performance. In some embodiments, performance information can also be viewed at the commodity level and a predetermined number of highest loss items (such as the "Top 6" highest loss items) in the category may be shown. This can be performed for any organizational entity in the enterprise or a group thereof. In some embodiments, the report data may be viewed for multiple items or categories and the report data may be sorted by criteria such as organizational level, dollar loss, unit loss, units sold, and percent loss.

It is to be clearly understood that the above description is intended by way of illustration and example only and is not intended to be taken by way of limitation. For example, the database schemas in FIGS. 4A and 4B could also track item-specific markdowns, which may have different markdown values or different markdown levels based upon the specified item. In some embodiments, the loss reporting system can be used to track loss associated with services. Other changes and modifications could be made.

What is claimed is:

1. A computer-based method for evaluating loss, the method comprising the steps of:
providing a computer system including at least a server and an associated database;
receiving at the server product data from multiple facilities of an enterprise;
storing the product data in the database associated with the server, wherein the database stores the product data in a plurality of database tables linked by foreign key relationships, including an Item table in which an item-id is a primary key, a Store_Daily_Item-Data table in which the item_id is both a primary key and a foreign key, and a Zone_Daily_Item_Data table in which the item_id is both a primary key and a foreign key;
the computer system performing the steps of:
calculating performance information for each facility from the product data;
comparing the performance information for each facility to a predetermined performance standard; and
generating a viewable on-screen report using the comparison between the performance information and the predetermined performance standard, the viewable on-screen report identifying cumulative item loss for the multiple facilities and including at least one selectable link pertaining to a given facility that failed to meet the predetermined performance standard, and user selection of the selectable link provides a viewable on-screen facility level report that shows at least unit loss or dollar loss for the item at the given facility.

2. The computer-based method for evaluating loss of claim 1, wherein the facilities are stores, the server is a zone server corresponding to the multiple facilities grouped in a common zone.

3. The computer-based method for evaluating loss of claim 1, wherein at least some of the product data from the enterprise facilities is associated with at least one perishable retail product.

4. The computer-based method for evaluating loss of claim 1, wherein the viewable report is accessed, and selection of the selectable link occurs at a terminal remote from the server and database.

5. The computer-based method for evaluating loss of claim 4, wherein the viewable report and viewable facility level report are web-based.

6. The computer-based method for evaluating loss of claim 4, wherein the step of calculating performance information occurs in response to a user request, the user request generated via a viewable interface that permits the user to select both an item and group of facilities.

7. The computer-based method for evaluating loss of claim 1, wherein the viewable report and viewable facility level report are printed.

8. The computer-based method for evaluating loss of claim 1, wherein the loss tracked by the reporting system includes product markdowns.

9. The computer-based method for evaluating loss of claim 8, wherein the product markdowns are organized by two or more markdown levels.

10. The computer-based method of evaluating loss of claim 1, wherein the performance information is organized into multiple performance categories, the performance categories defined by comparison of performance information to a predetermined performance standard, the reports using viewable indicia to denote which performance categories the performance information is associated with.

11. The computer-based method for evaluating loss of claim 1, wherein the reporting standard is exception-based.

12. The computer based method for evaluating loss of claim 1, further comprising identifying a predetermined number of products having greatest associated loss values using the product information; and reporting the predetermined number of products.

13. A computer-based method for evaluating loss, the method comprising the steps of:
  collecting product data of one or more items at facilities of an enterprise using a scanning device;
  sending the product data from the scanning device to a database remote from the scanning device;
  storing the product data in the database;
  providing at least one computer performing the steps of:
    calculating performance information from the stored product data;
    comparing the performance information to a predetermined enterprise performance standard for loss and markdown; and
    generating a viewable on-screen exception-based report using the comparison between the performance information and the predetermined performance standard, the on-screen report including at least one of a visual indicator to flag a loss performance level or text to flag a loss performance level; and
  wherein the viewable on-screen exception-based report can be sorted by criteria selected from at least each of multiple groups including organizational level, dollar loss, unit loss, units sold, and percent loss.

14. The computer-based method for evaluating loss of claim 13, wherein the reporting system can generate viewable exception-based reports vertically and horizontally across an organizational structure of the enterprise, the enterprise comprising multiple organizational entities.

15. The computer-based method for evaluating loss of claim 14, wherein the exception-based reports are generated by comparing performance information of a single organizational entity or group thereof with performance information of at least one other organizational entity or group thereof.

16. The computer-based method for evaluating loss of claim 14, further comprising generating a report displaying a predetermined number of items for which loss is determined to be the highest for an organizational entity or group thereof.

17. A computer-based system for evaluating loss comprising:
  an enterprise database having product data received from multiple enterprise facilities stored in memory, wherein the enterprise database stores the product data in a plurality of database tables linked by foreign key relationships, including an Item table in which an item-id is a primary key, a Store_Daily_Item-Data table in which the item_id is both a primary key and a foreign key, and a Zone_Daily_Item_Data table in which the item_id is both a primary key and a foreign key;
  one or more scanning devices for use in collecting the product data and transmitting the product data from the enterprise facilities to the enterprise database;
  one or more computer terminals remote from the enterprise database; and
  a performance calculation application that compares the product data with a predetermined performance loss standard; and
  a report-generating application that creates viewable reports displaying results using the comparison from the performance calculation application, whereby employees at the computer terminals can request and view reports from the report-generating application, wherein the report-generating application produces a viewable interface that permits the user to select both an item and group of facilities for which a viewable report should be generated.

18. The computer-based system for evaluating loss of claim 17, wherein the report-generating application includes a report structure in which the viewable report identifies cumulative item loss for multiple facilities and includes at least one selectable link pertaining to a given facility that failed to meet the predetermined performance loss standard, and user selection of the selectable link provides a viewable facility level report showing at least unit loss or dollar loss for the item at the given facility.

* * * * *

UNITED STATES PATENT AND TRADEMARK OFFICE
CERTIFICATE OF CORRECTION

| | | |
|---|---|---|
| PATENT NO. | : 8,078,484 B2 | |
| APPLICATION NO. | : 11/261218 | |
| DATED | : December 13, 2011 | |
| INVENTOR(S) | : Wayne Mark Benson and Joshua Alen Marsh | |

It is certified that error appears in the above-identified patent and that said Letters Patent is hereby corrected as shown below:

On title page, item (54)
    replace "LOSS PREPORTING SYSTEM AND METHOD WITH VIEWABLE PERFORMANCE BASED REPORTS"
    with --LOSS REPORTING SYSTEM AND METHOD WITH VIEWABLE PERFORMANCE BASED REPORTS--.

On title page, item (75) Inventors
    replace "Joshua Alan Marsh"
    with --Joshua Alen Marsh--.

Signed and Sealed this
Seventh Day of February, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,078,484 B2 | Page 1 of 1 |
| APPLICATION NO. | : 11/261218 | |
| DATED | : December 13, 2011 | |
| INVENTOR(S) | : Wayne Mark Benson and Joshua Alen Marsh | |

It is certified that error appears in the above-identified patent and that said Letters Patent is hereby corrected as shown below:

On title page, item (54) and at Column 1, lines 1-3, Title,
replace "LOSS PREPORTING SYSTEM AND METHOD WITH VIEWABLE PERFORMANCE BASED REPORTS"
with --LOSS REPORTING SYSTEM AND METHOD WITH VIEWABLE PERFORMANCE BASED REPORTS--.

On title page, item (75) Inventors
replace "Joshua Alan Marsh"
with --Joshua Alen Marsh--.

This certificate supersedes the Certificate of Correction issued February 7, 2012.

Signed and Sealed this
Twenty-eighth Day of February, 2012

David J. Kappos
*Director of the United States Patent and Trademark Office*